United States Patent
D et al.

(10) Patent No.: US 10,831,284 B2
(45) Date of Patent: Nov. 10, 2020

(54) CHARACTER INPUT ERROR CORRECTION

(71) Applicant: INTERNATIONAL BUSINESS MACHINES CORPORATION, Armonk, NY (US)

(72) Inventors: Manjunatha D, Murugesh Payla (IN); Dhandapani Shanmugam, Hal Post (IN); Yethish G. Venkataramanachari, Robertsonpet (IN); Siddique M. Adoni, St. Thomas Town (IN); Suman Mitra, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/451,703

(22) Filed: Jun. 25, 2019

(65) Prior Publication Data

US 2019/0317612 A1    Oct. 17, 2019

Related U.S. Application Data

(63) Continuation of application No. 15/805,228, filed on Nov. 7, 2017, now Pat. No. 10,394,344.

(51) Int. Cl.
    *G06F 3/02*    (2006.01)
    *G06F 3/023*   (2006.01)
    (Continued)

(52) U.S. Cl.
    CPC ........ *G06F 3/0238* (2013.01); *G06F 3/04886* (2013.01); *G06F 3/04895* (2013.01); *G06F 40/232* (2020.01); *G09B 21/00* (2013.01)

(58) Field of Classification Search
    CPC .............. G06F 3/0238; G06F 3/04886; G06F 3/04895; G06F 21/36; G06F 40/232; G09F 17/273; G09F 17/274
    See application file for complete search history.

(56) References Cited

U.S. PATENT DOCUMENTS 6,085,206 A    7/2000  Domini et al.
7,296,019 B1  11/2007  Chandrasekar et al.
(Continued)

OTHER PUBLICATIONS

List of IBM Patents or Applications Treated as Related, Jun. 21, 2019, 2 pgs.

(Continued)

*Primary Examiner* — Joe H Cheng
(74) *Attorney, Agent, or Firm* — Michael O'Keefe; Matthew M. Hulihan; Heslin Rothenberg Farley & Mesiti PC

(57) ABSTRACT

Character input error correction is provided by receiving from a keyboard character input by a user. The character input includes character input errors by the user, the character input errors being input of incorrect characters by the user via the keyboard. The character input errors of the character input are automatically identified and classified into character error classification(s). Each character error classification corresponds to a respective visual transformation of input characters. It is determined that a frequency of the identified and classified character input errors exceeds a predefined threshold confidence level for triggering application of keyboard corrections for user input. Based on the determining, keyboard corrections are applied for user input. The applying keyboard corrections includes applying a correction to character(s) displayed for or input by the user. The applied correction is based on at least one of the classification(s) into which the character input errors are classified.

20 Claims, 7 Drawing Sheets

(51) Int. Cl.
  *G06F 3/0488* (2013.01)
  *G06F 3/0489* (2013.01)
  *G09B 21/00* (2006.01)
  *G06F 40/232* (2020.01)

(56) References Cited

U.S. PATENT DOCUMENTS

| | | |
|---|---|---|
| 8,179,370 B1 | 5/2012 | Yamasani et al. |
| 8,210,850 B2 | 7/2012 | Blank |
| 8,612,213 B1 | 12/2013 | Zhai et al. |
| 9,028,257 B2 | 5/2015 | Duffy |
| 2004/0169366 A1 | 9/2004 | Duffell et al. |
| 2004/0218451 A1 | 11/2004 | Said et al. |
| 2005/0060273 A1 | 3/2005 | Andersen et al. |
| 2006/0028450 A1 | 2/2006 | Suraqui |
| 2006/0139312 A1 | 6/2006 | Sinclair, II et al. |
| 2006/0256139 A1 | 11/2006 | Gikandi |
| 2007/0074131 A1 | 3/2007 | Assadollahi |
| 2011/0035209 A1 | 2/2011 | Macfarlane |
| 2011/0090151 A1 | 4/2011 | Huang et al. |
| 2011/0179353 A1 | 7/2011 | Wood |
| 2011/0202836 A1 | 8/2011 | Badger et al. |
| 2012/0036469 A1 | 2/2012 | Suraqui |
| 2016/0179786 A1 | 6/2016 | Clark et al. |
| 2019/0138113 A1 | 5/2019 | D et al. |

OTHER PUBLICATIONS

Yu, J., "this glass keyboard and mouse combo is cool, but don't drop it on the floor", [retrieved on Aug. 11, 2017]. Retrieved from the Internet: < URL: https://www.cnet.com/news/this-glass-keyboard-and-mouse-combo-is-cool-but-dont-drop-it-on-the-floor/>, Nov. 28, 2011, 3 pgs.

Optimus Popularis, Artiebedev, 4 pages, available at https://www.artlebedev.com/optimus/popularis/ (retrieved Oct. 9, 2017).

Mell, Peter, et al., "The NIST Definition of Cloud Computing", NIST Special Publication 800-145, Sep. 2011, Gaithersburg, MD, 7 pgs.

CHARACTER INPUT ERROR CORRECTION

CROSS-REFERENCE TO RELATED APPLICATION

This application is a continuation of U.S. patent application Ser. No. 15/805,228, filed Nov. 7, 2017, now issued as U.S. Pat. No. 10,394,344 B2, the entirety of which is hereby incorporated herein by reference.

BACKGROUND

Because of various health conditions, certain individuals may not correctly understand or visualize various alphabets, letters, numbers, symbols, or the like (collectively referred to herein as "characters"). For example, when using a conventional QWERTY keyboard, the letter 'm' may appear to the user as a 'w' and vice versa. This can lead to incorrect input when the user types on the keyboard, and consequently confusing spellings, wordings, and statements that may not make sense to others on the receiving end of communications.

SUMMARY

Shortcomings of the prior art are overcome and additional advantages are provided through the provision of a computer-implemented method. The method receives from a keyboard of a computer system character input by a user. The character input includes character input errors by the user, the character input errors being input of incorrect characters by the user via the keyboard. The method automatically identifies the character input errors of the character input and classifies the character input errors into character error classification(s). Each character error classification corresponds to a respective visual transformation of input characters. The method determines that a frequency of the identified and classified character input errors exceeds a predefined threshold confidence level for triggering application of keyboard corrections for user input. The method, based on the determining, applies keyboard corrections for user input. The applying keyboard corrections includes applying a correction to character(s) displayed for or input by the user. The applied correction is based on at least one of the classification(s) into which the character input errors are classified.

Further, a computer program product including a computer readable storage medium readable by a processor and storing instructions for execution by the processor is provided for performing a method. The method receives from a keyboard of a computer system character input by a user. The character input includes character input errors by the user, the character input errors being input of incorrect characters by the user via the keyboard. The method automatically identifies the character input errors of the character input and classifies the character input errors into character error classification(s). Each character error classification corresponds to a respective visual transformation of input characters. The method determines that a frequency of the identified and classified character input errors exceeds a predefined threshold confidence level for triggering application of keyboard corrections for user input. The method, based on the determining, applies keyboard corrections for user input. The applying keyboard corrections includes applying a correction to character(s) displayed for or input by the user. The applied correction is based on at least one of the classification(s) into which the character input errors are classified.

Yet further, a computer system is provided that includes a memory and a processor in communication with the memory, wherein the computer system is configured to perform a method. The method receives from a keyboard of a computer system character input by a user. The character input includes character input errors by the user, the character input errors being input of incorrect characters by the user via the keyboard. The method automatically identifies the character input errors of the character input and classifies the character input errors into character error classification(s). Each character error classification corresponds to a respective visual transformation of input characters. The method determines that a frequency of the identified and classified character input errors exceeds a predefined threshold confidence level for triggering application of keyboard corrections for user input. The method, based on the determining, applies keyboard corrections for user input. The applying keyboard corrections includes applying a correction to character(s) displayed for or input by the user. The applied correction is based on at least one of the classification(s) into which the character input errors are classified.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
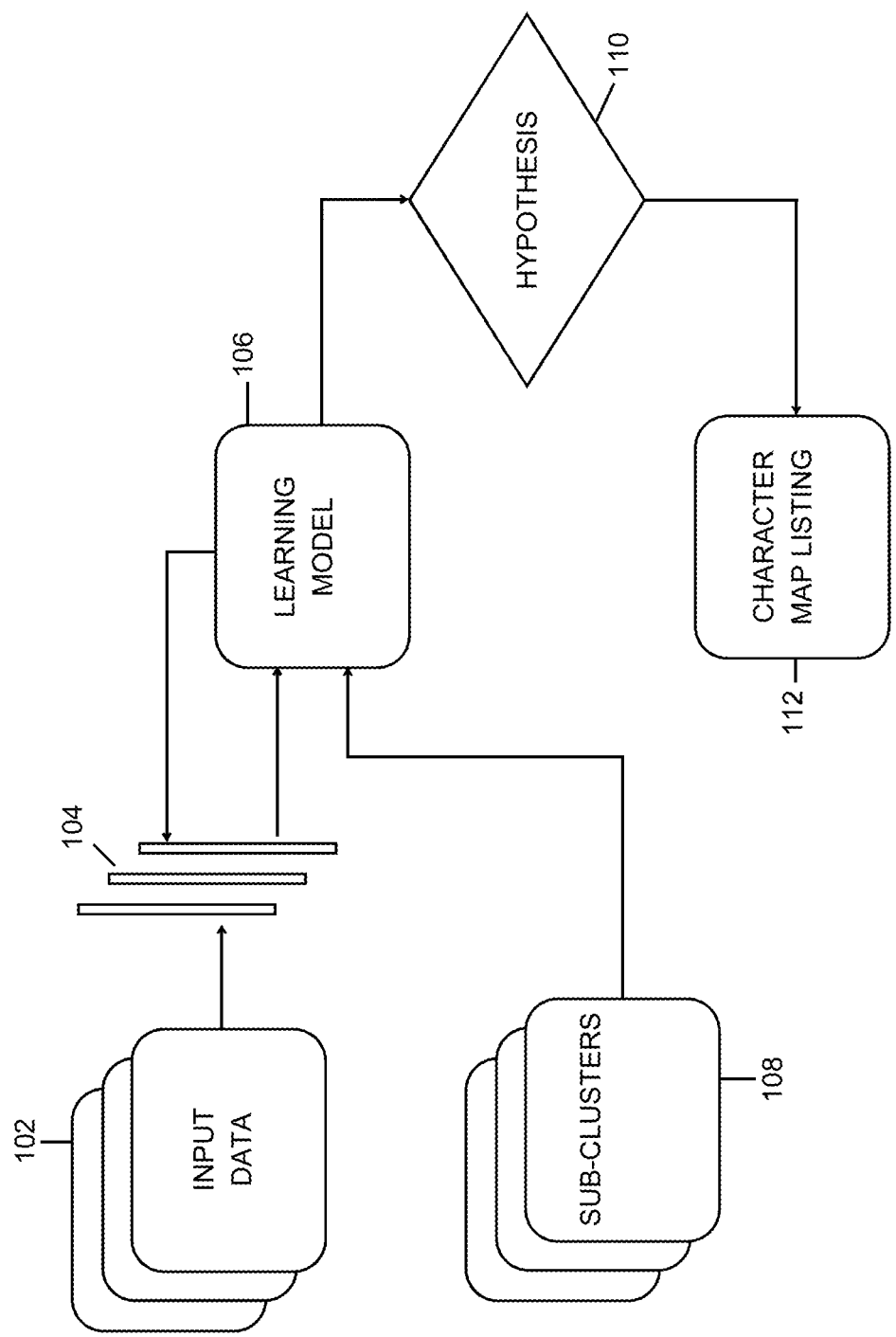
FIG. 1 depicts an example machine supervised learning model in accordance with aspects described herein.

There is a desire to cognitively enable the learning over time about a user's behavior in using a keyboard for character input, aiding the user in avoiding mistakes that the user tends to make, and providing correct and coherent input, for example to provide clearer communications for others. Aspects described herein can help address symptoms of various health conditions that result in character input errors by users when interacting with a keyboard of a computer system. Example such conditions include autism spectrum disorder (ASD) and dyslexia, though any of various other health conditions, afflictions, disorders, or the like (collectively referred to herein as "health conditions") could cause input errors. As used herein, a "subject" is a user having, being afflicted with, expressing, exhibiting, etc. a health condition. These health conditions can lead to people having difficulties in expressing their thoughts through speech, action, and emotions. One medium in which subjects may be more comfortable in presenting these expressions is in electronic format (written/typed) where they might make fewer mistakes.

There may be instances of miscommunication between the subject and others because of character input errors. Proposed herein are cognitive keyboard facilities that have the intelligence to learn a given user's nature of using the keyboard and aid the user in avoiding common mistakes made by the user and/or other users with a same or similar health condition. Assistance in addressing mistakes can be triggered based on reaching a confidence level that an adequate support will be offered by the keyboard.

As part of the learning, the proposed cognitive keyboard facilities may be fed with data indicating common mistakes made by the individual subject, subjects with the same or similar health condition, and/or people having complications in visual recognition of alphabets, letters, numbers, and other characters of the keyboard.

A subject with a health condition might misinterpret characters of a given alphabet. Common misinterpretations are reversals (reversing direction letter faces along a vertical axis) and inversions (flipping letters along a horizontal axis so that the letter is upside down) of characters. For instance, a subject may interchange 'p' with 'b', 'm' with 'w', and '3' with 'E'.

The cognitive keyboard facility can include software and/or hardware of a keyboard (a virtual keyboard presented by an operating system or a hardware peripheral keyboard, as examples), computer system, or a combination as described herein. Initially, the cognitive keyboard facility (or "keyboard" for short) can be configured with a confidence level for when the keyboard is to commence assisting based on observed usage by one or more users of the keyboard. As the keyboard learns about the behavior of subjects, including the characters they enter, which include character input errors, i.e. erroneous or unintended characters, a confidence level is used to determine when the keyboard would start assisting a user with input. Generally, it will determine, based on machine leaning, the kinds of errors the particular user makes. There will be some confidence level that the facility will properly be able to identify the mistakes that the person makes and correct them. Each user is different, and thus the system is to be able to adapt to different users' circumstances. The confidence may begin at an initial lowest point then grow to learn common or expected mistakes given the user's condition, in order to build a confidence in terms of what the patterns specific to the user are, and then providing accurate feedback.

The confidence level reaching a set threshold can trigger keyboard corrections as described in further detail below. An example base confidence level is 5%, meaning the system recognizes mistakes 5% or more of the time the person makes the mistake. As described herein, character input errors may be identified and classified. Once the system's confidence reflects this threshold, the system can invoke the keyboard corrections. Thus, a process can determine when a frequency of the identified and classified character input errors exceeds a predefined threshold confidence level for triggering application of keyboard corrections for user input.

The above-noted 5% confidence level threshold is just one example. The confidence level could be different for different health conditions or different 'levels' or 'classifications' within a given health condition. Thus, there could be multiple different thresholds that might apply, even for a given keyboard, depending on the particular subject and the particular health condition of that subject. A confidence level for a given user can therefore be selected from several different predefined confidence levels based on an identification of the user, and different users may the same health condition but at different levels of that health condition, therefore warranting different confidence levels.

The confidence level is in these examples a percentile that determines when the keyboard would start assisting with user input based on the character classification understood (for example left-right or top-bottom character mirroring). With respect to the classification understood, for a particular user with a given health condition, it may be generally known the types of character input errors the user is expected or most likely to make. These can be observed for patterns to form generalized classifications, such as a reversals and inversions.

A machine supervised learning model is leveraged that accepts input that may inform character input errors to look for in user character input. Example such input is technical, academic, and medical documents, literature that has been created by people with health conditions, and any other useful data.

FIG. 1 depicts an example machine supervised learning model in accordance with aspects described herein. In some embodiments, this may be implemented on compute resources of a cloud facility and/or provided as a cloud-based offering to consumers. Input data 102 is supplied to inform character input errors to look for in user character input. One example of input data is typed documents, emails, etc. by the subject with the health condition or multiple subjects with the health condition. This could be mined to identify character input errors that users (or the specific user) with the health condition tend to make. Another example of input data is technical papers written by doctors, researchers, or other professionals who study the health condition and present information useful to identifying the kinds of character input errors made.

In some embodiments, input data could match material that is typed by subject with a health condition, except that it is typed by a person without the health condition, therefore providing a comparison document that can be assumed to be the accurate representation of what the subject with the health condition was attempting to type.

Thus, input data can include text having character input errors presented therein and/or text describing character input errors that some individuals with given health conditions tend to make.

The input data is fed into the model to refine feature vectors 104. Machine learning typically starts with basic assumption(s) in terms of the 'features' desired to be understood. Certain 'features' can become a primary focus to understand the machine. Features can be built and refined over time as the understanding of the health conditions improves, and more particularly the understanding of the effects in terms of character input errors that result from the health conditions. In machine learning terminology this is encompassed within the concept of 'feature extraction'.

Therefore, part of the automated identification of character input errors in a subject input via a keyboard as described herein includes the constructing and refining of feature vectors for the machine learning model based on feature extraction. The feature vectors will be applied to the input of characters by a user. Initially and perhaps periodically over time, the machine learning model may be seeded with documents for analysis, the documents including literature specifying common character input errors and common character error classifications from observed individuals, e.g. subjects with the relevant health conditions.

The feature vectors work on the input data to produce information for the machine supervised learning model 106. The model 106 can profile a given subject in terms of a health condition and potential character error classifications the user does or is expected to exhibit. Sub-clusters 108 indicate character error clusters or classifications, which are generalized or specific examples of character error types. One classification may be left-to-right (or reversal), in which character pairs like ('p', 'q') and ('b', 'd') are interchanged. The generalized classification is that the user sometimes visualizes a letter as a mirror image of itself about a vertical axis. Another classification may be top-to-bottom (or inversion), in which character pairs like ('m','w') and ('M', 'W') are interchanged. The generalized classification is that the user sometimes visualizes a letter as a mirror image of itself about a horizontal axis. Yet another classification is a combined inversion and reversal (i.e. 180 degree rotation), in which character pairs like ('7', L) and ('3', 'E') are interchanged. These are just three example classifications; many others are possible, and may vary depending on the particular health condition.

Thus, part of the machine supervised learning model is to identify character input errors, for instance from user-typed input, and classify them into the classifications 108. The classifications will inform corrections applied later. For instance, as seen below, keyboard corrections, for example interchanging the labeling of two character keys on the keyboard, may be applied to help address the subject's mistakes.

The hypothesis 110 refers to the inquiry as to whether the model understands the user's behavior sufficiently to confidently render keyboard corrections. The model, having received and processed the input data, is to have a confidence about the nature of the particular subject using the keyboard. Initially, there is a base confidence, but that may be refined over time.

Eventually the hypothesis determines that the confidence level is sufficient and keyboard corrections can be applied. The system or cognitive keyboard is 'activated' for keyboard corrections. In this example, corrections are dictated by a characters map listing 112. Thus, user input is monitored and may serve to trigger corrections to be delivered as explained herein.

The model of FIG. 1 reflects the fact that character input by a user (or multiple users) is received from a keyboard of a computer system. The character input includes character input errors by the user, which are specific instances of reversals, inversions, etc. Thus, the character input errors are the input of incorrect characters by the user via the keyboard. Incorrect can refer to an unintended character input. The user might intend to type the letter 'm' and genuinely believe that 'm' has been typed based on striking the 'w' key. However, this is an input of an incorrect character in that the letter 'm' was intended or proper, but the actual input character (e.g. received from the generated keyboard interrupt) is not 'm'.

Such character input errors may be automatically identified to recognize that a mistake has been made. This may be based on all of the input literature and other input data, as well as the cognitive processing and refining of the feature vectors. The character input errors of the character input are identified and classified into character error classification(s) to learn the types of character errors the user tends to make. Each character error classification can correspond to a respective visual transformation of input characters, for instance a horizontal mirror/transformation, vertical mirror/transformation, etc., which are visual in nature. Visual similarity of the input characters, for instance ('V', 'Y', 'W') and ('Q', 'O') as examples, is another form of visual transformation.

Based on determining that the frequency of the errors exceeds the threshold for triggering the application of keyboard corrections, then such keyboard corrections for user input can be applied. An applied keyboard correction can include a correction to character(s) displayed for, or input by, the user.

One example type of keyboard correction is an adjustment made to the keys of a dynamic keyboard. A dynamic keyboard is one that may be modified in terms of key labeling, size, appearance, presence on the keyboard, etc. "Soft", "virtual", and on-screen keyboards are example dynamic keyboards. Dynamic keyboards can also be a hardware peripheral device with a modifiable digital interface enabling changes in key labeling and/or assignments as shown below. In the case of a dynamic keyboard, the keyboard correction may be to change the dynamic keyboard to swap character labels on keys—this is a 'correction' to characters displayed on the keyboard itself.

Another example type of keyboard correction is particularly useful if the keyboard with which the subject interacts to supply user input is a static keyboard for which key labeling cannot be easily dynamically and automatically changed. In this case, the character data supplied for a key when selected may be changed. If the user selects a physical key labeled with a first character (e.g. a '6'), the keyboard or computer system may be configured to register a second, different character (e.g. a '9').

FIGS. 2A, 2B, 3A, and 3B depict example keyboard corrections applied for user input, in accordance with aspects described herein. In particular, the examples depict a dynamic keyboard with a light emitting diode (LED) display that aids the user in viewing the characters on the keyboard. In some cases, the keys themselves include or are the LED devices.

Figure 2A:
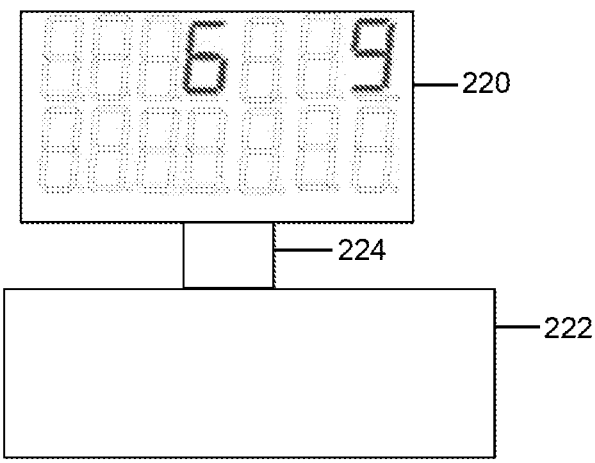
FIGS. 2A, 2B, 3A, and 3B depict example keyboard corrections applied for user input, in accordance with aspects described herein.

Referring initially for FIG. 2A, depicted is a cognitive dynamic keyboard 220 in a deactivated state. Keyboard 220 is in data communication with motherboard 222 of a computer system via a bus or other data communication path 224. Highlighted are two 'keys' of the keyboard, the 6 and the 9 keys, shown in their typical positions, in which numbers are arranged consecutively in increasing numerical. The keyboard in FIG. 2A is in a deactivated state in that the keyboard correction has not yet been applied.

Figure 2B:
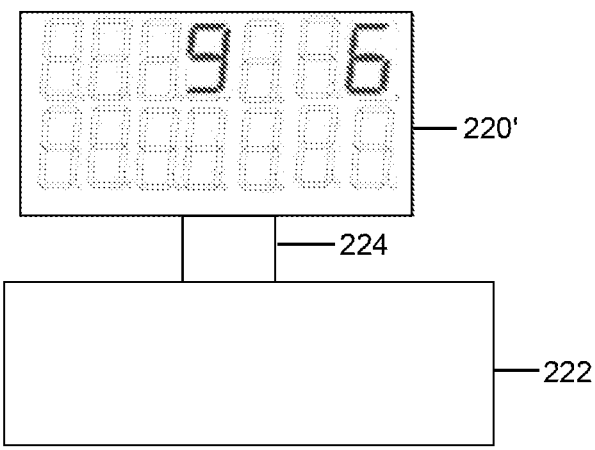

FIG. 2B depicts the cognitive keyboard (220') in an active state in which the key display is changed based on the classification that is exhibited by the user's character input behavior in switching the characters 6 and 9. Here, the user visualizes the character '6' as a character '9' and vice versa. The keyboard correction in this example is changing the character labeling of the 6 and 9 keys on this keyboard. Specifically, the '6' key is labeled '9' and the '9' key is labeled '6', as depicted, effectively switching the character labeling of the two keys. When the user types the key labeled '9', the actual input is the character/number for 6, and when the user types the key labeled '6', the actual input is the character/number for 9. Thus, the respective character supplied to the computer system based on selection of each key (the 6 or the 9) remains the same prior to and after the swapping the character labels of these two keys.

Figure 3A:
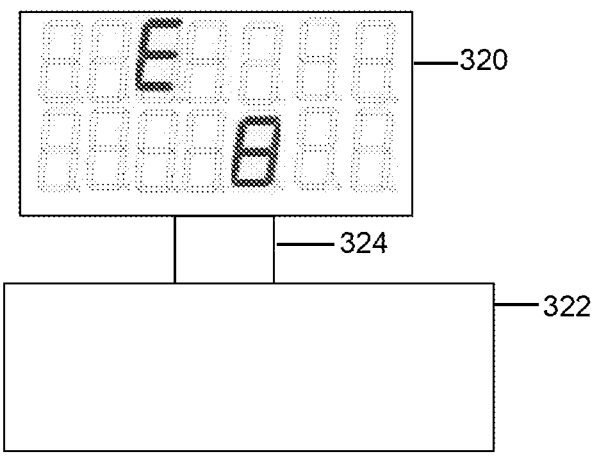
Figure 3B:
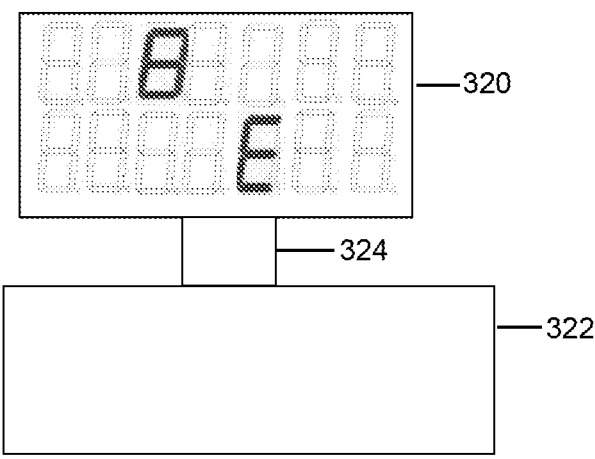

FIGS. 3A and 3B collectively depict another example, this time with the 'E' and the 'B' characters of the LED keyboard. FIG. 3A shows dynamic keyboard 320 in a deactivated state insofar as the 'E' and 'B' keys are labeled as such in their regular/conventional positions of the keyboard. Keyboard 320 is in data communication with motherboard 322 via a bus 324. FIG. 3B depicts the cognitive keyboard (320') in an active state in which the labeling of the 'E' and 'B' keys has changed to swap their labels; the 'E' key is now labeled 'B' and vice versa.

It is noted that the cognitive keyboard facility, which may include some or all of the processing of the learning model and some or all of the processing to apply the keyboard corrections, may be implemented as software or firmware of the keyboard itself and/or the computer system of which the keyboard is a part. For instance, firmware performing the above keyboard correction aspects could reside in the keyboard, a layer running in the operating system, or a component of the motherboard, as examples. In a particular embodiment, the learning model is implemented on a backend, such as a cloud or other remote facility with which a computer system of which the subject keyboard is a part is in communication. The computer system communicates with the backend and implements keyboard corrections indicated by the processing of the backend, which identifies the particular corrections to apply (e.g. swap the '6' and '9' keyboard key labels) given the identified user and user's behavior with respect to character input.

Another form of keyboard correction is to apply a substitution of the character selected by the user with another character—one that the user intended to enter. This may be particularly useful when the keyboard involved is a static keyboard that does not support character labeling changes. In this case, a transformation is applied after a user selects a character key as part of the user's input. For instance, if a keyboard correction to correct vertical reversals is to be applied, then the system could recognize selection of a 'b' by the user and provide the letter 'd' instead (i.e. provide the character code for 'd'). Accordingly, applying the keyboard correction in this scenario includes, based on the user's selection of a key labeled with a character label representing a first character (b'), providing a second character (d') to the computer system different from the first character. This could be handled in firmware/software of the keyboard, for example.

Thus, a cognitive keyboard facility described herein is capable of learning and understanding any arbitrary heath condition that causes character input errors, regardless of the physical/mental challenges the subject has. Additionally, depending on which user is using a dynamic keyboard, the system could apply different corrections tailored to the particular user's health condition and behavior. User identity could be gleaned in any desired way, for instance using facial or other recognition techniques, based on the user account or name logged into the computer system, or any other manner. Furthermore, the proposed cognitive keyboard can be applied to physical keyboards, as well as touch-based soft keyboards, user interfaces, touch screens, etc. on many different types of computer systems.

In addition, the rules for identifying character input errors can focus on the subjects' nature of visual recognition/interchange of characters. Consequently, the corrections applied can focus on and address those specific kinds of errors experienced in the user's expressions.

Accordingly, provided is a system and methodology for a cognitive keyboard facility that can identify a health condition of a user and aid the user in avoiding mistakes brought about by that condition. The facility can leverage the dynamic nature of the display system of the keyboard. The particular character to be displayed for any given key may be controlled by a program running behind the scenes as software/firmware that may automatically apply keyboard corrections. The parameters (e.g. feature vectors and input data) for the model to learn the nature of subject users is controllable and configurable, as is the confidence level to apply in determining whether/when to invoke the keyboard corrections for subject users.

Figure 4:
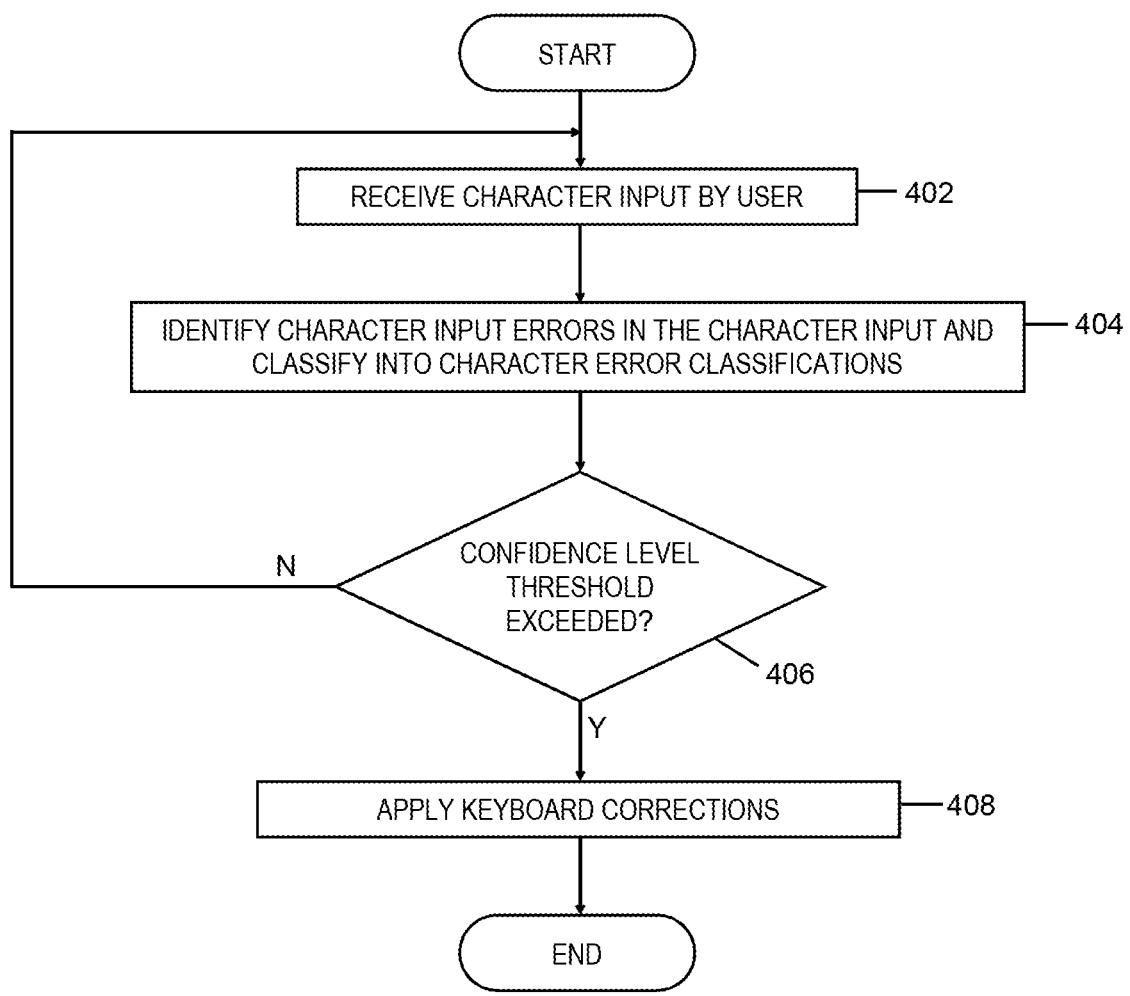
FIG. 4 depicts an example process for character input error correction, in accordance with aspects described herein.

FIG. 4 depicts an example process for character input error correction in accordance with aspects described herein. In some examples, the process is performed by one or more computer systems, such as those described herein, which may include one or more computer systems of a user, one or more cloud servers, and/or one of more other computer systems.

The process receives from a keyboard of a computer system character input by a user (402). The character input includes character input errors by the user, the character input errors being input of incorrect characters by the user via the keyboard. In some examples, the keyboard is a dynamic keyboard.

The process automatically identifies the character input errors of the character input and classifies the character input errors into one or more character error classifications (404). Each such character error classification may correspond to a respective visual transformation of input characters.

The automatically identifying the character input errors can include constructing and refining feature vectors for a machine learning model based on feature extraction, and applying the feature vectors to the character input by the user. In this regard, initially a process can seed the machine learning model with documents for analysis, the documents include literature specifying common character input errors and common character error classifications from observed individuals, as examples.

In some embodiments, a visual transformation of input characters that corresponds to a character error classification a vertical transformation of input characters, horizontal transformation of input characters, and/or a visual similarity of input characters.

The process of FIG. 4 continues with a determination of whether a frequency of the identified and classified character input errors exceeds a predefined threshold confidence level for triggering application of keyboard corrections for user input (406). The confidence level can be selected from any of a plurality of different predefined confidence levels, and such selection may be based on an identification of the user.

If inquiry (406) is answered in the negative, the process returns to (402) and continues to receive character input by the user.

Otherwise, based on determining that a frequency of the identified and classified character input errors exceeds a predefined threshold confidence level for triggering application of keyboard corrections for user input, the process continues by applying keyboard corrections for user input (408). The keyboard corrections, once applied, may persist for any desired amount of time. The application of the keyboard corrections can include applying a correction to one or more characters displayed for or input by the user, and the applied correction can be based on at least one of the one or more classifications into which the character input errors are classified.

The keyboard correction includes, as an example, changing character labeling of at least one key of the keyboard. Changing the character labeling can switch character labels of two or more keys of the keyboard.

A character provided to the computer system based on selection of a key of the at least one key can remain the same prior to and after the changing, despite a character label of the key being changed to represent a different character. For instance, the 'b' key, when struck, can still be used to enter a 'b' even though its label may have been changed to a 'd'.

Changing the character labeling can therefore swap character labels of two keys, the two keys labeled with two characters that the user has interchanged when typing, as determined based on at least some of the identified character input errors. A respective character supplied to the computer system based on selection of each key of the two keys can remain the same prior to and after the swapping the character labels of the two keys.

In some examples, for instance in the example involving a static keyboard, the keyboard correction can include, based on selection of a key of the keyboard, the key labeled with a character label representing a first character, providing a second character to the computer system different from the first character, the first and second characters being two characters that the user has interchanged when typing, as determined based on at least some of the identified character input errors.

Although various examples are provided, variations are possible without departing from a spirit of the claimed aspects.

Figure 5:
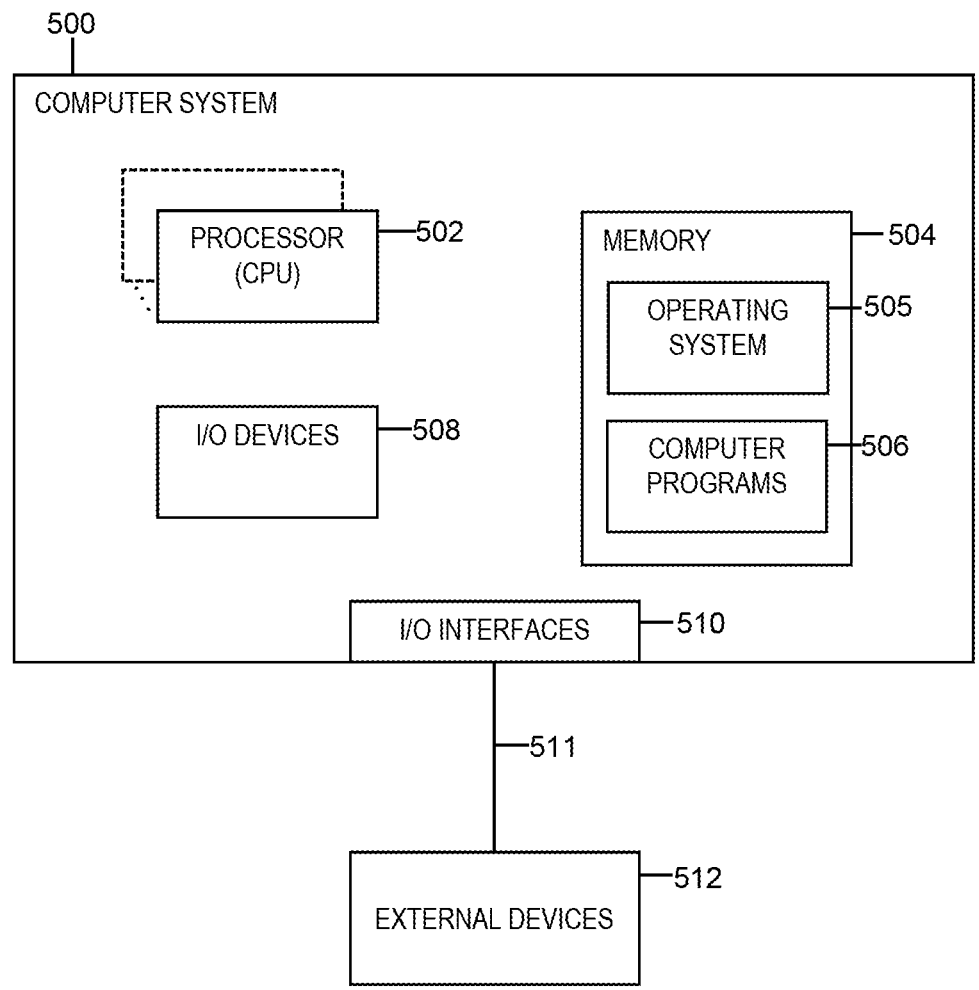
FIG. 5 depicts one example of a computer system and associated devices to incorporate and/or use aspects described herein.

Processes described herein may be performed singly or collectively by one or more computer systems of independent components, peripherals, or the like, thereof. FIG. 5 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, N.Y., USA), Intel Corporation (Santa Clara, Calif., USA) or ARM Holdings plc (Cambridge, England, United Kingdom), as examples.

FIG. 5 shows a computer system 500 in communication with external device(s) 512. Computer system 500 includes one or more processor(s) 502, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 502 can also include register(s) to be used by one or more of the functional components. Computer system 500 also includes memory 504, input/output (I/O) devices 508, and I/O interfaces 510, which may be coupled to processor(s) 502 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 504 can be or include main or system memory (e.g. Random Access Memory) used in the execution of program instructions, storage device(s) such as hard drive(s), flash media, or optical media as examples, and/or cache memory, as examples. Memory 504 can include, for instance, a cache, such as a shared cache, which may be coupled to local caches (examples include L1 cache, L2 cache, etc.) of processor(s) 502. Additionally, memory 504 may be or include at least one computer program product having a set (e.g., at least one) of program modules, instructions, code or the like that is/are configured to carry out functions of embodiments described herein when executed by one or more processors.

Memory 504 can store an operating system 505 and other computer programs 506, such as one or more computer programs/applications that execute to perform aspects described herein. Specifically, programs/applications can include computer readable program instructions that may be configured to carry out functions of embodiments of aspects described herein.

Examples of I/O devices 508 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (512) coupled to the computer system through one or more I/O interfaces 510.

Computer system 500 may communicate with one or more external devices 512 via one or more I/O interfaces 510. Example external devices include a keyboard, a pointing device, a display, and/or any other devices that enable a user to interact with computer system 500. Other example external devices include any device that enables computer system 500 to communicate with one or more other computing systems or peripheral devices such as a printer. A network interface/adapter is an example I/O interface that enables computer system 500 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 510 and external devices 512 can occur across wired and/or wireless communications link(s) 511, such as Ethernet-based wired or wireless connections. Example wireless connections include cellular, Wi-Fi, Bluetooth®, proximity-based, near-field, or other types of wireless connections. More generally, communications link(s) 511 may be any appropriate wireless and/or wired communication link(s) for communicating data.

Particular external device(s) 512 may include one or more data storage devices, which may store one or more programs, one or more computer readable program instructions, and/or data, etc. Computer system 500 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 500 may be operational with numerous other general purpose or special purpose computing system environments or configurations. Computer system 500 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

Aspects described herein may be incorporated into and/or use a cloud computing environment. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes. One such node is node 10 depicted in FIG. 5.

Computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

Figure 6:
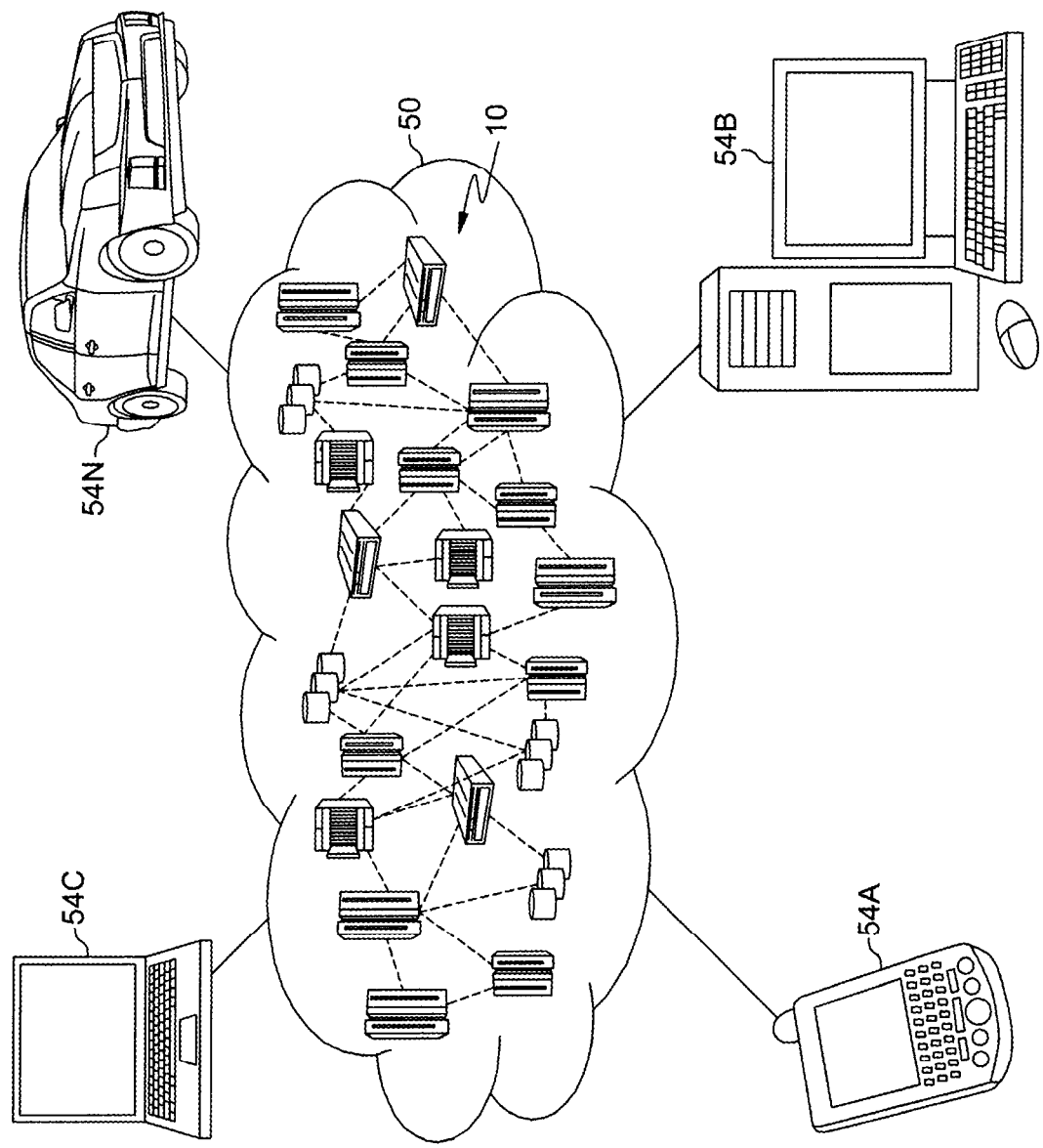
FIG. 6 depicts a cloud computing environment according to an embodiment of the present invention.

Referring now to FIG. 6, illustrative cloud computing environment 50 is depicted. As shown, cloud computing environment 50 comprises one or more computing nodes 10 with which local computing devices used by cloud consumers, such as, for example, smartphone or other mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof.

This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
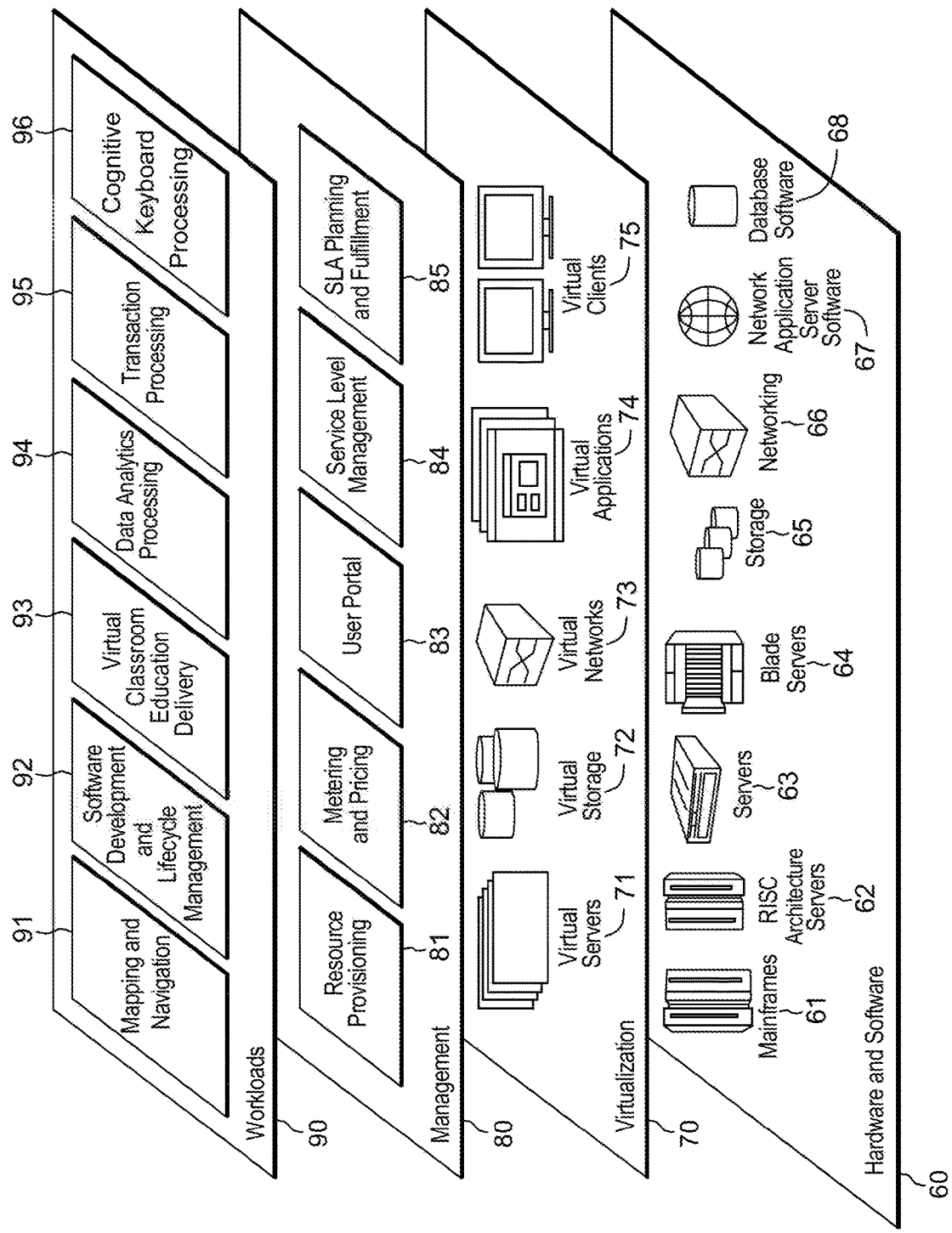
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cognitive keyboard processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
receiving, from a keyboard of a computer system, character input by a user, the character input comprising character input errors by the user, each character input error of the character input errors being input of a respective incorrect character by the user via the keyboard;
automatically identifying the character input errors of the character input and classifying the character input errors into one or more character error classifications, each character error classification of the one or more character error classifications corresponding to a respective visual transformation of input characters, the visual transformation comprising a geometric property that relates an intended character to another character interchanged for the intended character;
determining that a frequency with which the identified and classified character input errors are being made exceeds a predefined threshold confidence level for triggering application of keyboard corrections for user input; and based on the determining, applying keyboard corrections for user input, the applying keyboard corrections comprising applying a correction to one or more characters displayed for, or input by, the user, the applied correction to the one or more characters being based on at least one of the one or more character error classifications into which the character input errors are classified.

2. The method of claim 1, wherein the keyboard comprises a dynamic keyboard and wherein the keyboard correction comprises changing character labeling of at least one key of the keyboard.

3. The method of claim 2, wherein a character provided to the computer system based on selection of a key of the at least one key remains the same prior to and after the changing, despite a character label of the key being changed to represent a different character.

4. The method of claim 2, wherein the changing the character labeling switches character labels of two or more keys of the keyboard.

5. The method of claim 4, wherein the changing the character labeling swaps character labels of two keys, the two keys labeled with two characters that the user has interchanged when typing, as determined based on at least some of the identified character input errors, and wherein a respective character supplied to the computer system based on selection of each key of the two keys remains the same prior to and after the swapping the character labels of the two keys.

6. The method of claim 1, wherein a visual transformation of input characters corresponding to a character error classification of the one or more character error classifications is selected from the group consisting of: vertical transformation of input characters, horizontal transformation of input characters, and a visual similarity of input characters.

7. The method of claim 1, wherein the automatically identifying the character input errors comprises constructing and refining feature vectors for a machine learning model based on feature extraction, and applying the feature vectors to the character input by the user.

8. The method of claim 7, further comprising seeding the machine learning model with documents for analysis, the documents comprising literature specifying common character input errors and common character error classifications from observed individuals.

9. The method of claim 1, wherein the confidence level is selected from a plurality of different predefined confidence levels based on an identification of the user.

10. A computer system comprising:
a memory; and
a processor in communication with the memory, wherein the computer system is configured to perform a method comprising:
receiving, from a keyboard of a computer system, character input by a user, the character input comprising character input errors by the user, each character input error of the character input errors being input of a respective incorrect character by the user via the keyboard;
automatically identifying the character input errors of the character input and classifying the character input errors into one or more character error classifications, each character error classification of the one or more character error classifications corresponding to a respective visual transformation of input characters, the visual transformation comprising a geometric property that relates an intended character to another character interchanged for the intended character;
determining that a frequency with which the identified and classified character input errors are being made exceeds a predefined threshold confidence level for triggering application of keyboard corrections for user input; and
based on the determining, applying keyboard corrections for user input, the applying keyboard corrections comprising applying a correction to one or more characters displayed for, or input by, the user, the applied correction to the one or more characters being based on at least one of the one or more character error classifications into which the character input errors are classified.

11. The computer system of claim 10, wherein the keyboard comprises a dynamic keyboard and wherein the keyboard correction comprises changing character labeling of at least one key of the keyboard.

12. The computer system of claim 11, wherein a character provided to the computer system based on selection of a key of the at least one key remains the same prior to and after the changing, despite a character label of the key being changed to represent a different character.

13. The computer system of claim 11, wherein the changing the character labeling switches character labels of two or more keys of the keyboard.

14. The computer system of claim 10, wherein the changing the character labeling swaps character labels of two keys, the two keys labeled with two characters that the user has interchanged when typing, as determined based on at least some of the identified character input errors, and wherein a respective character supplied to the computer system based on selection of each key of the two keys remains the same prior to and after the swapping the character labels of the two keys.

15. The computer system of claim 10, wherein a visual transformation of input characters corresponding to a character error classification of the one or more character error classifications is selected from the group consisting of: vertical transformation of input characters, horizontal transformation of input characters, and a visual similarity of input characters.

16. A computer program product comprising:
a non-transitory computer readable storage medium readable by at least one processor and storing instructions for execution by the at least one processor for performing a method comprising:
receiving, from a keyboard of a computer system, character input by a user, the character input comprising character input errors by the user, each character input error of the character input errors being input of a respective incorrect character by the user via the keyboard;
automatically identifying the character input errors of the character input and classifying the character input errors into one or more character error classifications, each character error classification of the one or more character error classifications corresponding to a respective visual transformation of input characters, the visual transformation comprising a geometric property that relates an intended character to another character interchanged for the intended character;
determining that a frequency with which the identified and classified character input errors are being made exceeds a predefined threshold confidence level for triggering application of keyboard corrections for user input; and based on the determining, applying keyboard corrections for user input, the applying keyboard corrections comprising applying a correction to one or more characters displayed for, or input by the user, the applied correction to the one or more characters being based on at least one of the one or more character error classifications into which the character input errors are classified.

17. The computer program product of claim 16, wherein the keyboard comprises a dynamic keyboard and wherein the keyboard correction comprises changing character labeling of at least one key of the keyboard.

18. The computer program product of claim 17, wherein a character provided to the computer system based on selection of a key of the at least one key remains the same prior to and after the changing, despite a character label of the key being changed to represent a different character.

19. The computer program product of claim 17, wherein the changing the character labeling switches character labels of two or more keys of the keyboard.

20. The computer program product of claim 19, wherein the changing the character labeling swaps character labels of two keys, the two keys labeled with two characters that the user has interchanged when typing, as determined based on at least some of the identified character input errors, and wherein a respective character supplied to the computer system based on selection of each key of the two keys remains the same prior to and after the swapping the character labels of the two keys.

* * * * *